United States Patent [19]
Lee et al.

[11] Patent Number: 5,543,240
[45] Date of Patent: Aug. 6, 1996

[54] FUEL CELL STACK

[75] Inventors: Seo-jae Lee; Il-gon Kim; Jong-wook Lee, all of Suwon, Rep. of Korea

[73] Assignee: Samsung Electronics Co., Ltd., Kyungki-Do, Rep. of Korea

[21] Appl. No.: 516,194

[22] Filed: Aug. 17, 1995

[30] Foreign Application Priority Data

Aug. 17, 1994 [KR] Rep. of Korea .................. 94-20291

[51] Int. Cl.⁶ .................................................. H01M 8/04
[52] U.S. Cl. ................................................ 429/38; 429/39
[58] Field of Search ............................. 429/34, 38, 39, 429/210, 41

[56] References Cited

U.S. PATENT DOCUMENTS

| | | | |
|---|---|---|---|
| 4,345,009 | 8/1982 | Fahle et al. | 429/38 X |
| 4,508,793 | 4/1985 | Kumata et al. | 429/39 X |
| 4,623,596 | 11/1986 | Kamoshita | 429/39 X |
| 4,706,737 | 11/1987 | Taylor et al. | 429/34 X |
| 4,714,661 | 12/1987 | Kaun et al. | 429/14 |
| 5,376,472 | 12/1994 | Hartvigsen et al. | 429/38 X |
| 5,480,738 | 1/1996 | Elangovan et al. | 429/38 X |

*Primary Examiner*—Anthony Skapars
*Attorney, Agent, or Firm*—Sughrue, Mion, Zinn, Macpeak & Seas

[57] ABSTRACT

A fuel cell stack is provided in which a reaction gas can be uniformly distributed among fuel cell units disposed within the stack. In particular, the fuel cell stack contains a plurality of fuel cell blocks which are stacked upon each other, and each fuel cell block contains a plurality of fuel cell units which are stacked upon each other. The reaction gas is supplied to each fuel cell block via an external manifold located outside the fuel cell stack. An internal manifold is located within each fuel cell block and receives the reaction gas from the external manifold. Subsequently, the internal manifold distributes the gas to each fuel cell unit. As a result, the fuel cell stack is able to uniformly distribute the reaction gas to each fuel cell unit, thereby increasing the efficient utilization of fuel.

18 Claims, 4 Drawing Sheets

FUEL CELL STACK

FIELD OF THE INVENTION

The present invention relates to a fuel cell stack. More particularly, the present invention relates to a fuel cell stack in which gas seals can be easily maintained to ensure that the fuel cell stack is safe and that the reaction gases can be uniformly distributed to each fuel cell unit within the fuel cell stack. Furthermore, the fuel cell stack of the present invention is capable of isolating a defective portion of the fuel cell stack from the remainder of the fuel cell stack, thereby improving the efficient utilization of fuel.

BACKGROUND OF THE INVENTION

A fuel cell stack is a new device for generating electricity and comprises a plurality of fuel cell units. Each fuel cell unit directly converts chemical energy produced by an electrochemical reaction of a fuel gas (or reaction gas) and an oxidizing gas into electrical energy. A fuel cell unit is similar to a general cell due to the fact that it comprises two electrodes and an electrolyte. However, a fuel cell unit is different from a general cell because the fuel gas and oxidizing gas are continuously supplied to the fuel cell unit.

Fuel cells can be classified into several different categories. For example, molten carbonate fuel cells are fuel cells which operate at high temperatures ranging from about 500° C. to about 700° C. Phosphate fuel cells are cells which operate at temperatures around 200° C. Alkaline fuel cells are cells which operate from room temperature to about 100° C. Finally, solid fuel cells are cells which operate at high temperatures of 1000° C. or more.

Typical voltages produced by a single fuel cell unit range from 0.7 to 1.0 V under a 100–200 mA/cm$^2$ current density. Therefore, power densities of 0.5 to 2 kW/m$^2$ can be produced by a single fuel cell unit. Accordingly, in order to obtain higher voltages and currents, a fuel cell stack can be created by arranging a plurality of fuel cell units in series or parallel with each other.

Most fuel cell stacks comprise fuel cell units which are arranged in series and which have anodes and cathodes respectively connected to bipolar plates. The bipolar plates are made from a material which is conductive and resists corrosion in a strong oxidizing and reducing environment.

The operation of a fuel cell unit within a fuel cell stack will be described with reference to FIG. 1. As shown in the figure, a fuel cell unit comprises a matrix 1 made of a porous insulating material, an anode 2, and a cathode 3. In order to form a fuel cell stack, a plurality of fuel cell units are stacked on top of each other by interposing bipolar plates 4 between adjacent fuel cell units. When a reaction gas such as hydrogen gas is supplied to the anode 2 of one of the fuel cell units, the gas is transformed by a catalytic reaction into hydrogen ions and electrons. Subsequently, the hydrogens ion travel across the electrolyte to cathode 3.

In addition, an oxidizing gas such as oxygen gas is supplied to the cathode 3 of the fuel cell unit. As a result, the hydrogen ions, which traveled across the electrolyte, and the oxygen gas electrochemically react to produce water vapor and electricity.

In the case of a phosphoric acid fuel cell, the fuel cell units are stacked on top of each other and are separated by graphite bipolar plates. Consequently, a single large fuel cell stack can be created to produce a large amount of electrical power by supplying the stack with the required amount of reaction gas.

The manners in which the reaction gases can be supplied to the fuel cell stack are classified into two categories: the internal manifold supply method (FIG. 2) or the external manifold supply method (FIG. 3).

FIG. 2 illustrates the internal manifold supply method. As shown in the figure, hydrogen gas is supplied to the fuel cell stack via an inlet 21 and is distributed to the individual fuel cell units by an internal manifold 23 provided inside the stack. Subsequently, the gas passes over the anode 2 of each fuel cell unit via hydrogen gas channels 25, is collected by an internal manifold 24, and is discharged from the manifold 24 via an outlet 22. In addition, oxygen gas passes over the cathodes of each of the fuel cell units via oxygen gas channels 26. Each hydrogen gas channel 25 is separated from each oxygen gas channel 26 by the matrix and electrolytes 27 of each fuel cell unit.

FIG. 3 illustrates the external manifold supply method. As shown in the figure, hydrogen gas is supplied via an inlet 31 to an external manifold 33 located outside of the fuel cell stack. Subsequently, the external manifold 33 distributes the hydrogen gas to each fuel cell unit via the hydrogen gas channels 25, is collected by an external manifold 34, and is discharged from the manifold 34 via an outlet 32.

As indicated by the description above, the internal manifold supply method is safer than the external manifold supply method because the gas seals within the internal manifold supply system are easier to maintain and are more reliable. However, as the number of the fuel cell units increases in an internal manifold supply system, the difficulty of uniformly supplying the reaction gas to each fuel cell unit increases. Therefore, as the number of fuel cell units increase, the performance of the fuel cell stack decreases.

On the other hand, the external manifold supply system is advantageous over the internal manifold supply system because the reaction gas can be more uniformly distributed to each fuel cell unit. However, as the number of fuel cell units increase, the size of the fuel cell stack significantly increases. Furthermore, maintaining adequate gas seals around the fuel cell units becomes extremely difficult because the external manifold is provided outside the stack.

In addition, a fuel cell stack implementing an internal manifold supply system and a fuel cell stack implementing an external manifold supply system also have problems which are common to both devices. For example, neither system has the ability to selectively isolate a portion the fuel cell units within the stack. Thus, if a fuel cell unit malfunctions, the supply of reaction gas to the defective unit cannot be stopped. Consequently, the efficient operation of both of the fuel cell stacks significantly decreases if one of the fuel cell units fails.

SUMMARY OF THE INVENTION

In order to solve the various problems mentioned above, it is an object of the present invention to provide a fuel cell stack which has reliable gas seals and which uniformly distributes fuel.

To accomplish the above objects of the present invention, a fuel cell stack is provided which comprises a plurality of fuel cell blocks, wherein each of the plurality of fuel cell blocks comprises a plurality of fuel cell units and an internal manifold. In addition, each of the plurality of fuel cell units comprises an anode, a cathode, and a matrix containing an electrolyte, and the internal manifold comprises an input and a plurality of outputs. Furthermore, the plurality of outputs of the internal manifold are respectively connected to the plurality of fuel cell units.

The fuel cell stack also comprises an external manifold comprising a plurality of branches, wherein each of the branches is respectively connected to the input of the internal manifold in each of the plurality of fuel cell blocks.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 4:
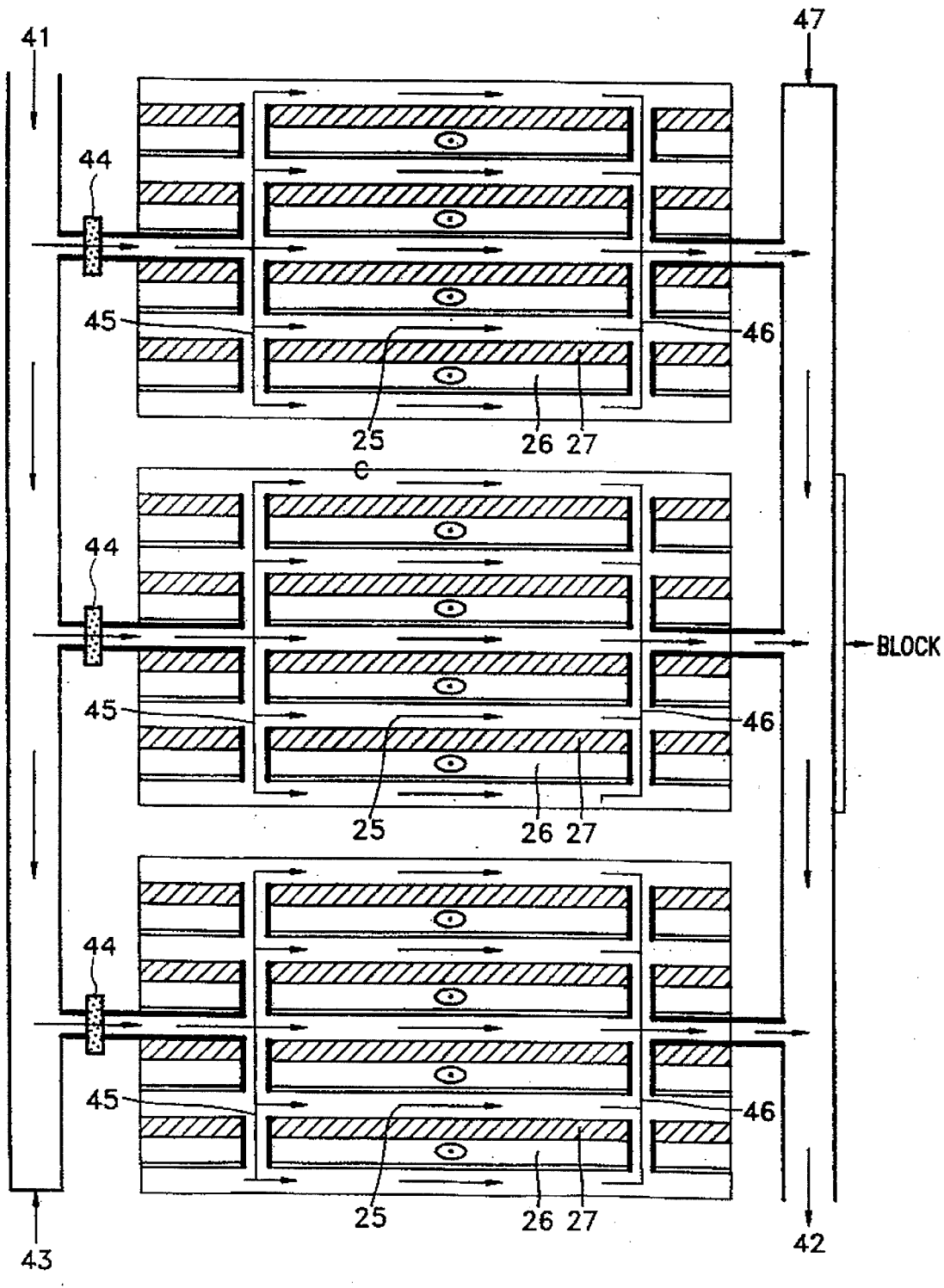
FIG. 4 is a schematic cross-sectional view showing a fuel cell stack according to all embodiment of the present invention.

FIG. 4 is a cross-sectional view of a fuel cell stack according to an embodiment of the present invention. As shown in the figure, the fuel cell stack comprises a plurality of fuel cell blocks. Each fuel cell block contains a plurality of fuel cell units and is connected to an inlet 41 via an external manifold 43. Furthermore, each branch of the external manifold 43 is connected to an internal manifold 45 located inside each fuel cell block, and each internal manifold 45 is connected to the corresponding fuel cell units via reaction gas channels 25.

Based on the above structure, the reaction gas is supplied to the external manifold 43 via the inlet 41, and the gas is respectively distributed to the fuel cell blocks via the branches of the external manifold 43. As shown in FIG. 4, each branch contains a valve 44 for selectively controlling the amount of reaction gas which flows through each branch to the corresponding fuel cell unit. As a result, the valves 44 can be used to selectively prevent the supply of the reaction gas to individual fuel cell blocks.

After the reaction gas travels through one of the branches of the external manifold 43, the gas enters an internal manifold 45 located within each fuel cell block. Subsequently, the internal manifold 45 distributes the reaction gas to each anode 2 of each fuel cell unit within the block.

Figure 1:
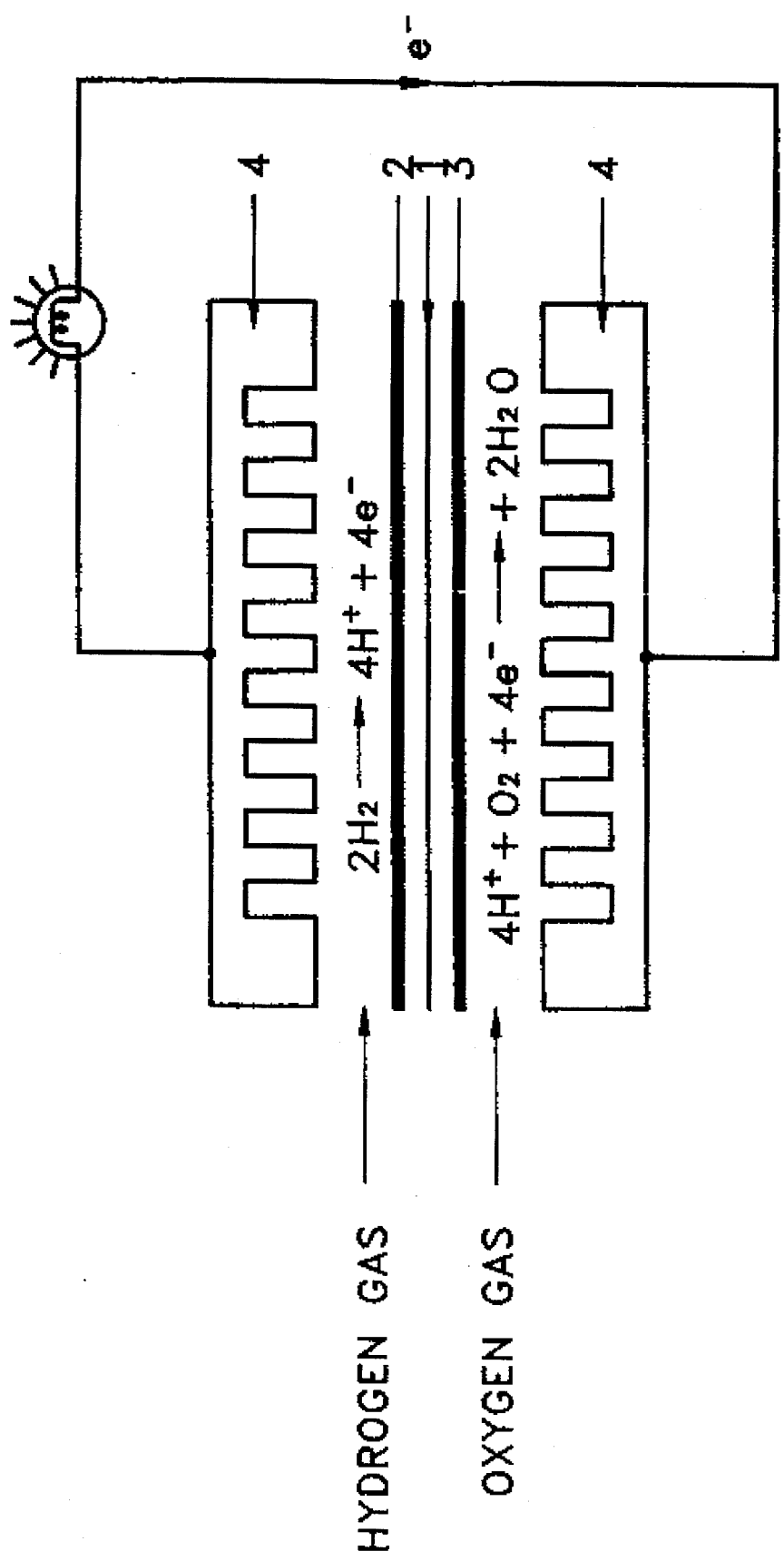
FIG. 1 is a schematic cross-sectional view illustrating a general operation of a fuel cell.

As described above with reference to FIG. 1, the reaction gas electrochemically reacts to form water vapor and generate electricity. After the reaction, the water vapor and unreacted gas in each fuel cell unit continue to travel along the gas channels 25 into an internal manifold 46, emerge from each of the fuel cell blocks via an external manifold 47 located outside the stack, and flow through an outlet 42.

A comparison between the fuel cell stack of the present embodiment and a fuel cell stack having an internal manifold supply method was performed to evaluate aspects of the relative efficiency between the two types of fuel cell stacks. Specifically, nine fuel cell units were arranged according to both the internal manifold supply method and the method of the present embodiment, and the difference between the highest and lowest voltage values of each fuel cell stack were observed.

Figure 2:
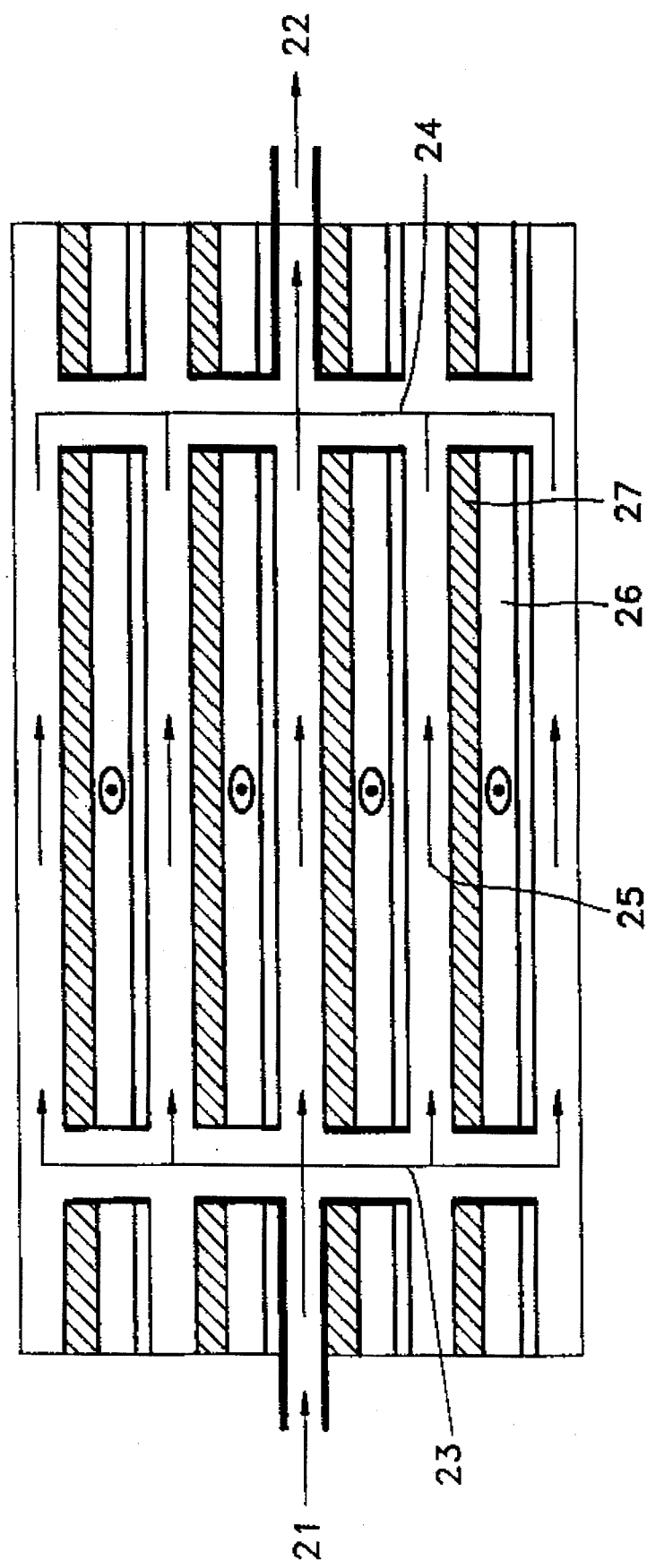
FIG. 2 is a schematic cross-sectional view showing an internal manifold type fuel cell.
Figure 3:
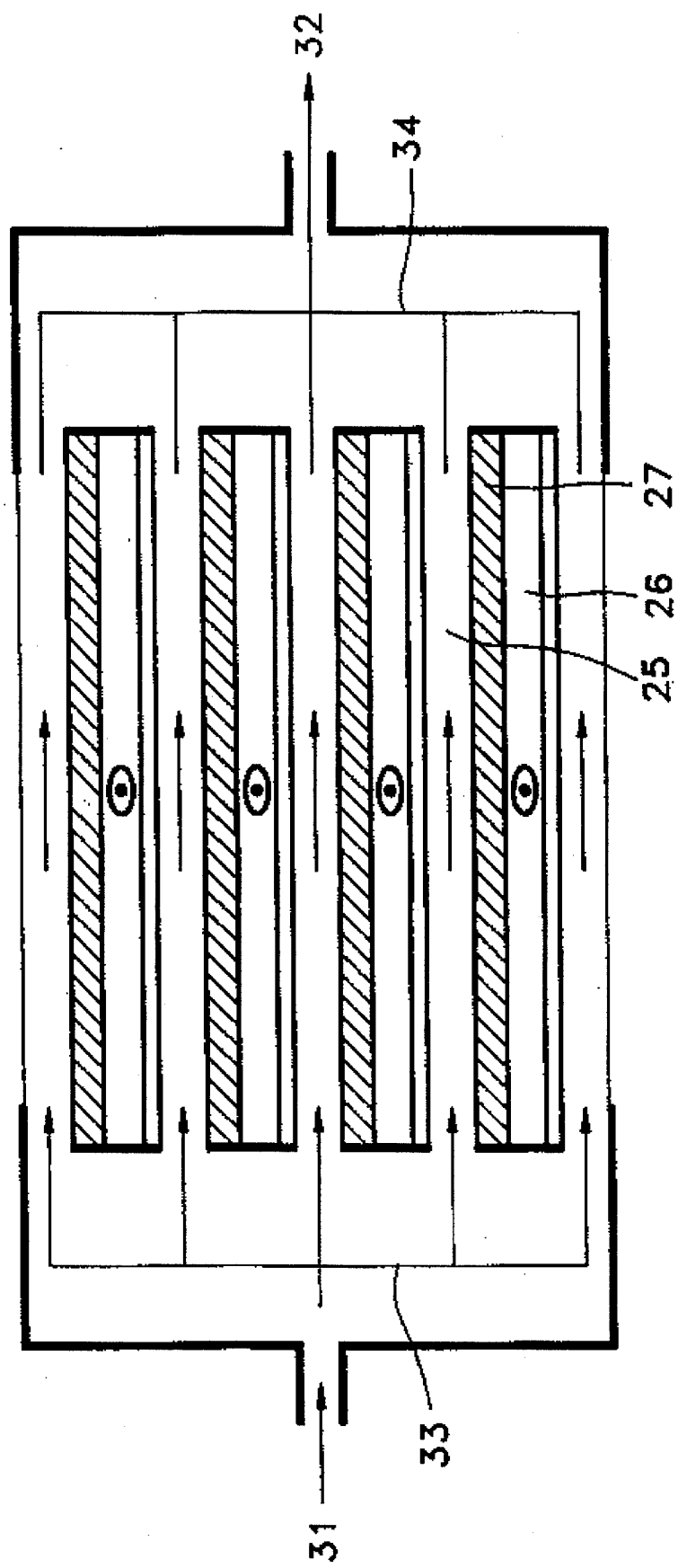
FIG. 3 is a schematic cross-sectional view showing an external manifold type fuel cell.

In the method illustrated in FIG. 2, the difference between the highest and lowest voltage values was on the order of hundreds of mV. In contrast, in the present embodiment, the difference between the highest and lowest voltage values was only on the order of tens of mV. Also, in the present embodiment, even when the number of fuel cell units in the fuel cell stack was increased, the difference between the highest and lowest voltage values was nearly same as that of the stack having nine fuel cell units. Accordingly, the comparison confirmed that the fuel cell stack of the present invention uniformly distributed the reaction gas into each fuel cell unit, irrespective of the number of fuel cell units contained within the stack.

Also, in the fuel cell stack implementing only the internal manifold supply method, a malfunction of any one fuel cell units significantly reduced the efficiency of the entire fuel cell stack. Accordingly, the entire operation of the fuel cell stack had to be stopped in order to repair the device.

On the other hand, since the present embodiment comprises valves 44 between each of the branches of the external manifold 43 and the fuel cell blocks, any block containing a malfunctioning fuel cell unit can be isolated from the remaining fuel cell blocks to prevent the reaction gas from being wasted. Therefore, if any of the fuel cell units malfunctions, the block containing the defective fuel cell unit can be isolated from the stack by closing the appropriate valve 44. Therefore, the operation of the entire fuel cell stack does not need to be stopped while repairing the defective fuel cell unit.

As described above, the fuel cell stack according to the present invention is produced by creating a predetermined number of fuel cell blocks, each block comprising a predetermined number of stacked fuel cell units. The reaction gas is introduced into each block by using an external manifold provided outside the fuel cell stack and is then distributed uniformly into each fuel cell unit of each block by using internal manifolds provided inside the fuel cell blocks. Accordingly, the safety of the stack is increased due to ease of maintaining gas seals, and the reaction gas can be distributed uniformly into each fuel cell unit. In addition, a defective fuel cell unit can be isolated from the rest of the fuel cell stack to improve the efficient utilization of the reaction gas and to maintain the continuous operation of the stack for a longer time without decreasing the performance of the other functional fuel cell units.

While the present invention has been described in connection with a preferred embodiment, the invention is not intended to be limited to the disclosed embodiment but is intended to cover various modifications and equivalent arrangements included within the spirit and scope of the appended claims.

What is claimed is:

1. A fuel cell stack comprising:

1) a plurality of fuel cell blocks, wherein each of said plurality of fuel cell blocks comprises:
   a) a plurality of fuel cell units, wherein each of said plurality of fuel cell units comprises an anode, a cathode, and a matrix containing an electrolyte;
   b) a first internal manifold comprising a first input and a plurality of first outputs, wherein said plurality of first outputs are respectively connected to said plurality of fuel cell units.

2) a first external manifold comprising a plurality of first branches, wherein each of said first branches is respectively connected to said first input of said first internal manifold in each of said plurality of fuel cell blocks.

2. The fuel cell stack according to claim 1, wherein each of said plurality of fuel cell blocks further comprises:

a plurality of bipolar plates, wherein said plurality of bipolar plates are respectively interposed between said plurality of fuel cell units.

3. The fuel cell stack according to claim 1, further comprising:

a plurality of valves respectively provided on each of said first branches of said first external manifold for controlling an amount of reaction gas supplied to each of said plurality of fuel cell blocks.

4. The fuel cell stack according to claim 1, wherein each of said plurality of fuel cell blocks further comprises:

a second internal manifold comprising a plurality of second inputs and a second output, wherein said plurality of second inputs are respectively connected to said plurality of fuel cell units.

5. The fuel cell stack according to claim 4, further comprising:

a second external manifold comprising a plurality of second branches, wherein each of said plurality of second branches is respectively connected to said second output of said second internal manifold in each of said plurality of fuel cell blocks.

6. The fuel cell stack according to claim 1, further comprising:

an inlet connected to an input of said first external manifold.

7. The fuel cell stack according to claim 5, further comprising:

an outlet connected to an output of said second external manifold.

8. The fuel cell stack according to claim 1, wherein each of said plurality of fuel cell blocks further comprises:

a plurality of reaction gas channels respectively associated with each of said plurality of fuel cell units, wherein said plurality of first outputs of said first internal manifold are respectively connected to said plurality of reaction gas channels.

9. The fuel cell stack according to claim 4, wherein each of said plurality of fuel cell blocks further comprises:

a plurality of reaction gas channels respectively associated with each of said plurality of fuel cell units, wherein said plurality of first outputs of said first internal manifold are respectively connected to said plurality of reaction gas channels.

10. The fuel cell stack according to claim 9, wherein said plurality of second inputs of said second internal manifold are respectively connected to said plurality of reaction gas channels.

11. A fuel cell stack comprising:

1) a plurality of fuel cell blocks, wherein each of said plurality of fuel cell blocks comprises:

a) a plurality of fuel cell units, wherein each of said plurality of fuel cell units comprises an anode, a cathode, and a matrix containing an electrolyte;

b) a plurality of reaction gas channels respectively associated with each of said plurality of fuel cell units;

b) a first internal manifold comprising a first input and a plurality of first outputs, wherein said plurality of first outputs are respectively connected to first ends of said plurality of reaction gas channels;

c) a second internal manifold comprising a plurality of second inputs and a second output, wherein said plurality of second inputs are respectively connected to second ends of said plurality of reaction gas channels;

2) a first external manifold comprising a plurality of first branches, wherein each of said first branches is respectively connected to said first input of said first internal manifold in each of said plurality of fuel cell blocks;

3) a second external manifold comprising a plurality of second branches, wherein each of said plurality of second branches is respectively connected to said second output of said second internal manifold in each of said plurality of fuel cell blocks.

12. The fuel cell stack according to claim 11, further comprising:

a plurality of valves respectively provided on each of said first branches of said first external manifold for controlling an amount of reaction gas supplied to each of said plurality of fuel cell blocks.

13. A fuel cell stack comprising:

1) a first fuel cell block, wherein said first fuel cell block comprises:

a) a plurality of first fuel cell units, wherein each of said plurality of first fuel cell units comprises an anode, a cathode, and a matrix containing an electrolyte;

b) a first internal manifold comprising a first input and a plurality of first outputs, wherein said plurality of first outputs are respectively connected to said plurality of first fuel cell units;

2) a second fuel cell block, wherein said second fuel cell block comprises:

a) a plurality of second fuel cell units, wherein each of said plurality of second fuel cell units comprises an anode, a cathode, and a matrix containing an electrolyte;

b) a second internal manifold comprising a second input and a plurality of second outputs, wherein said plurality of second outputs are respectively connected to said plurality of second fuel cell units;

3) an input external manifold comprising a first input branch and a second input branch, wherein said first input branch is connected to said first input of said first internal manifold and wherein said second input branch is connected to said second input of said second internal manifold.

14. The fuel cell stack according to claim 13, wherein said first and second input branches of said input external manifold respectively comprise first and second valves for controlling an amount of reaction gas supplied to said first fuel cell block and said second fuel cell block.

15. The fuel cell stack according to claim 13, wherein:

said first fuel cell block comprises a third internal manifold comprising a plurality of third inputs and a third output, wherein said plurality of third inputs are respectively connected to said plurality of first fuel cell units, and said second fuel cell block comprises a fourth internal manifold comprising a plurality of fourth inputs and a fourth output, wherein said plurality of fourth inputs are respectively connected to said plurality of second fuel cell units.

16. The fuel cell stack according to claim 15, further comprising:

an output external manifold comprising a first output branch and a second output branch, wherein said first output branch is connected to said third output of said third internal manifold and wherein said second output branch is connected to said fourth output of said fourth internal manifold.

17. The fuel cell stack according to claim 16, wherein:

said first fuel cell block comprises a plurality of first reaction gas channels respectively associated with said plurality of first fuel cell units, wherein said plurality of first outputs of said first internal manifold are respectively connected to said plurality of first reaction gas channels, and said second fuel cell block comprises a plurality of second reaction gas channels respectively associated with said plurality of second fuel cell units, wherein said plurality of second outputs of said second internal manifold are respectively connected to said plurality of second reaction gas channels.

18. The fuel cell stack according to claim 17, wherein:

said plurality of third inputs of said third internal manifold are respectively connected to said plurality of first reaction gas channels, and said plurality of fourth inputs of said fourth internal manifold are respectively connected to said plurality of second reaction gas channels.

\* \* \* \* \*